(12) United States Patent
Sheehan et al.

(10) Patent No.: US 9,290,337 B2
(45) Date of Patent: Mar. 22, 2016

(54) GRAIN BUGGY ASSEMBLY

(75) Inventors: John Sheehan, Drayton North (AU); Glen Picone, Drayton North (AU)

(73) Assignee: JDS (QLD) PTY LTD, Queensland (AU)

(*) Notice: Subject to any disclaimer, the term of this patent is extended or adjusted under 35 U.S.C. 154(b) by 525 days.

(21) Appl. No.: 13/255,469

(22) PCT Filed: Mar. 15, 2010

(86) PCT No.: PCT/AU2010/000294
§ 371 (c)(1),
(2), (4) Date: Sep. 8, 2011

(87) PCT Pub. No.: WO2010/105287
PCT Pub. Date: Sep. 23, 2010

(65) Prior Publication Data
US 2011/0318151 A1    Dec. 29, 2011

(30) Foreign Application Priority Data
Mar. 18, 2009   (AU) ................. 2009100247

(51) Int. Cl.
*B65F 1/00*     (2006.01)
*B65G 69/04*    (2006.01)
*B60P 1/36*     (2006.01)

(52) U.S. Cl.
CPC ............... *B65G 69/0433* (2013.01); *B60P 1/36* (2013.01)

(58) Field of Classification Search
USPC .......................... 414/523, 469, 470, 526, 507
See application file for complete search history.

(56) References Cited

U.S. PATENT DOCUMENTS

| | | | |
|---|---|---|---|
| 2,517,300 A | | 7/1947 | Giese |
| 3,034,667 A | | 5/1962 | Kline et al. |
| 3,097,460 A | | 7/1963 | O'Brien |
| 3,414,241 A | * | 12/1968 | De Shano ................... 366/1 |
| 4,095,705 A | * | 6/1978 | Hood ....................... 414/519 |
| 4,109,336 A | | 8/1978 | Ford |
| 4,545,719 A | * | 10/1985 | Busboom ................ 414/523 |
| 4,619,576 A | | 10/1986 | George et al. |
| 4,669,945 A | | 6/1987 | Pollard |
| 4,754,864 A | | 7/1988 | Cross, Jr. |
| 5,794,423 A | | 8/1998 | McLeod |

(Continued)

FOREIGN PATENT DOCUMENTS

| | | |
|---|---|---|
| GB | 1328729 | 6/1971 |
| GB | 2158798 | 11/1985 |

(Continued)

OTHER PUBLICATIONS

Australian Examiner's Report dated Feb. 16, 2010.
Australian Examiner's Report dated Mar. 26, 2010.

*Primary Examiner* — Saul Rodriguez
*Assistant Examiner* — Willie Berry, Jr.
(74) *Attorney, Agent, or Firm* — Berliner Steffin Azod LLP

(57) ABSTRACT

The present invention relates to a grain buggy assembly. The grain buggy assembly includes a grain buggy and a conveyor for movably mounting to the buggy. In use, the conveyor can be moved from a retracted configuration in which the conveyor is retracted relative to the buggy to a grain loading configuration. In the grain loading configuration, the conveyor can extend from the buggy to receive grain for conveyance to the buggy. In one embodiment, the conveyor is pivotally mounted to the grain buggy.

4 Claims, 4 Drawing Sheets

(56) References Cited

U.S. PATENT DOCUMENTS

| | | |
|---|---|---|
| 5,888,044 A | 3/1999 | Baskerville |
| 5,906,471 A * | 5/1999 | Schwoerer .................. 414/505 |
| 7,267,519 B2 | 9/2007 | Cresswell et al. |
| 2003/0063968 A1 | 4/2003 | Zaun et al. |
| 2008/0210145 A1 | 9/2008 | Petersen et al. |

FOREIGN PATENT DOCUMENTS

| | | |
|---|---|---|
| WO | WO2006/007626 A1 | 1/2006 |
| WO | WO2006/098617 | 9/2006 |

* cited by examiner

GRAIN BUGGY ASSEMBLY

TECHNICAL FIELD

The present invention generally relates to a grain buggy assembly.

BACKGROUND

The reference to any prior art in this specification is not, and should not be taken as an acknowledgement or any form of suggestion that the prior art forms part of the common general knowledge.

Grains including corn, milo, rice, soybeans, and wheat are harvested by a machine known as a combine harvester (or "combine") which typically performs multiple parallel harvesting runs across a field. The combine cuts the stalks at the ground, and then separates the grain from the stalks. The grain is deposited in a storage area of the combine and the chaff is discharged back onto the field.

When the harvested grain in a combine reaches capacity, the combine is often in the middle of the field. A tractor pulls a grain buggy (or grain cart) alongside the combine and the harvested grain is loaded into the grain buggy via an unloading auger of the combine, whether the combine is stationary or continuously harvesting. In turn, the grain buggy transports the harvested grain to a waiting truck at the edge of the field.

During loading of the grain buggy from the combine, it is desirable that the grain buggy travel in combine tracks (called "tramlines") made during a previous combine run to minimize soil compaction. However in practice as combine widths increase, the unloading auger of the combine cannot reach across the combine to unload grain into the grain buggy located in the combine tracks. Instead, the grain buggy must stray from the combine tracks to receive the grain which undesirably results in increased soil compaction.

Embodiments of the present invention enable the grain buggy to receive grain from the combine auger whilst remaining in the combine tracks.

SUMMARY OF THE INVENTION

According to one aspect of the present invention, there is provided a grain buggy assembly including:
 a grain buggy; and
 a conveyor for movably mounting to the buggy so that the conveyor can be moved from a retracted configuration in which the conveyor is retracted relative to the buggy to a grain loading configuration in which the conveyor can extend from the buggy to receive grain for conveyance to the buggy.

In one embodiment, the conveyor in the grain loading configuration can convey the grain from the combine auger to the buggy whilst the buggy remains in the combine tracks.

The conveyor may be pivotally mounted to the grain buggy. In the retracted configuration, the conveyor may be aligned along the grain buggy for storage during transport. In the loading configuration, the conveyor may extend transverse and at a right angle to the buggy.

The grain buggy may include a vessel for receiving grain from the conveyor and a distribution auger extending along an upper portion of the vessel for distributing heaped grain within the vessel. The grain buggy may further include a quartet of wheels each rotationally mounted relative to the vessel. The grain buggy may include a hitch arrangement extending from the vessel and for hitching the buggy to a motorized vehicle.

The grain buggy assembly may include a hydraulic arrangement for driving the conveyor and the distribution auger with respective hydraulic motors. In one embodiment, the conveyor may be manually moved between the retracted and grain loading configurations.

The conveyor may be a belt conveyor including a pair of rollers about which an endless belt extends. In one embodiment, the belt is of comparable width to the length of the vessel.

The grain buggy assembly may further include a moving arrangement for moving the conveyor from the retracted configuration to the grain loading configuration, and visa versa. The moving arrangement may include a conveyor support for extending upwardly from the grain buggy and for fastening to an unloading end of the conveyor. The conveyor support may include a pair of panels between which a slew ring is provided so that the panels can pivot relate to each other. The conveyor support may further include a pair of uprights terminated by one of the panels, the other panel being fixedly fastened to the conveyor. The grain buggy assembly may further include another conveyor support extending upwardly from the grain buggy and for supporting a loading end of the conveyor in the retracted configuration.

The moving arrangement may further include a stabilising arm extending between a loading end of the conveyor and the grain buggy. The moving arrangement may further include a stabilising arm support for fastening to an outside wall of the grain buggy to support the stabilising arm.

The moving arrangement may include a telescopic ram extending between the conveyor and the grain buggy. A conveyor end of the ram may be connected to the conveyor between the stabilising arm and the conveyor support. The moving arrangement may include the hydraulic arrangement for extending the hydraulic ram to move the conveyor from the grain loading configuration to the retracted configuration. The grain buggy assembly may further include a ram support extending from the conveyor support and for supporting the extended ram.

According to another aspect of the present invention, there is provided a conveyor assembly for mounting to an agricultural transporter, the conveyor assembly including:
 a conveyor; and
 a moving arrangement for movably mounting the conveyor relative to the transporter so that the conveyor can be moved from a retracted configuration in which the conveyor is retracted relative to the transporter to a loading configuration in which the conveyor can extend from the transporter to receive a crop for conveyance to the transporter.

The agricultural transporter may include a grain buggy for towing by a motorised vehicle.

According to another aspect of the present invention, there is provided a moving arrangement for movably mounting a conveyor relative to an agricultural transporter so that the conveyor can be moved from a retracted configuration in which the conveyor is retracted relative to the transporter to a loading configuration in which the conveyor can extend from the transporter to receive a crop for conveyance to the transporter.

According to another aspect of the present invention, there is provided a method for loading an agricultural transporter using a conveyor, the method including the step of:
 moving the conveyor from a retracted configuration in which the conveyor is retracted relative to the transporter to a loading configuration in which the conveyor extends from the transporter to receive a crop for conveyance to the transporter.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1b is an upper perspective view of the grain buggy assembly of FIG. 1a;

FIG. 2b is an upper perspective view of the grain buggy assembly of FIG. 2a;

DETAILED DESCRIPTION OF PREFERRED EMBODIMENTS

Figure 1A:
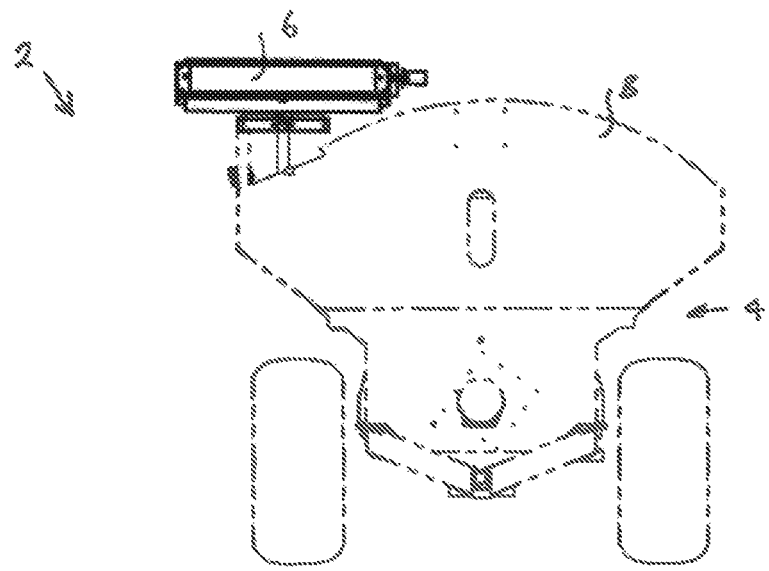
FIG. 1a is a front end view of a grain buggy assembly in accordance with an embodiment of the present invention having a conveyor in a retracted configuration.
Figure 1B:
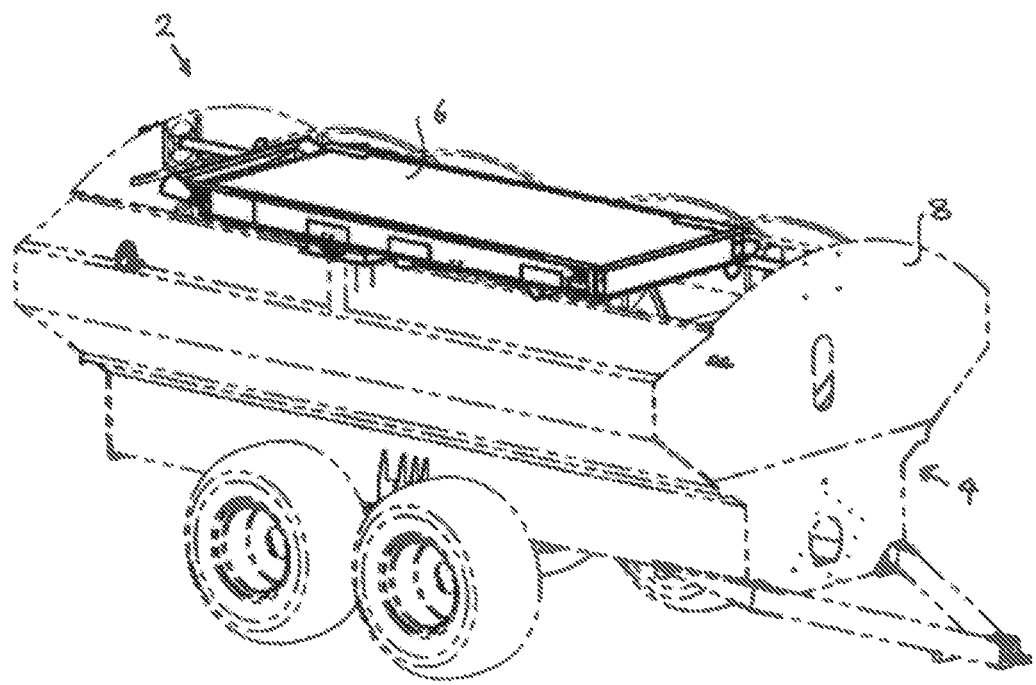
Figure 2A:
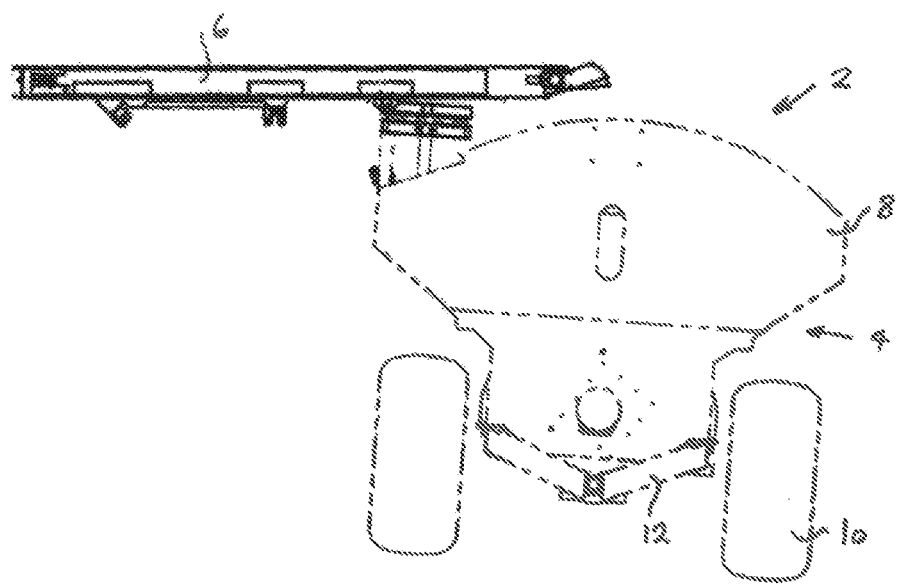
FIG. 2a is a front end view of the grain buggy of FIG. 1 with the conveyor in a grain loading configuration.
Figure 2B:
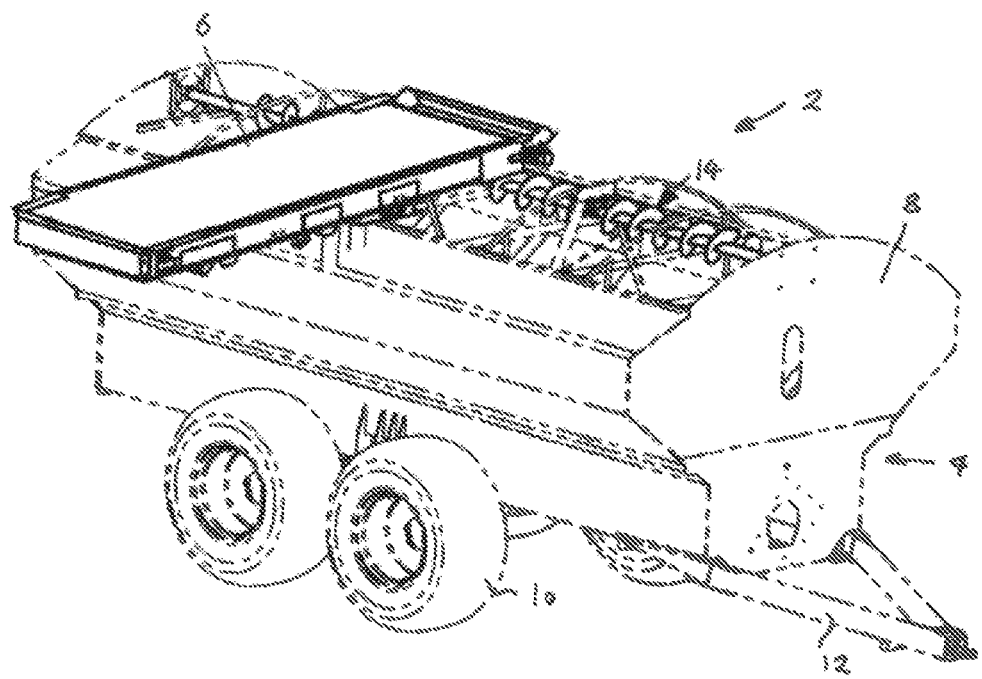

According to an embodiment of the present invention, there is provided a grain buggy assembly 2 as shown in FIGS. 1 to 3. The grain buggy assembly 2 includes an elongate grain buggy 4 for towing by a tractor and an elongate conveyor 6 for movably mounting to the buggy 4. The conveyor 6 can be placed in a retracted configuration shown in FIG. 1, in which the conveyor 6 is retracted relative to the buggy 4 and is aligned along the grain buggy for storage during transport. In use, the conveyor 6 can be moved from the retracted configuration to a grain loading configuration shown in FIG. 2 in which the conveyor extends from the buggy 4 to receive grain for conveyance to the buggy 4. In the grain loading configuration, the conveyor 6 extends transverse and at a right angle to the buggy 4 so that grain can be conveyed from a combine auger to the buggy 4 whilst the buggy 4 remains in combine tracks. A detailed description of the grain buggy assembly 2 is provided below.

Turning to FIG. 2, the grain buggy 4 includes a grain storage vessel 8 for receiving grain from the conveyor 6. The grain buggy 4 further includes a quartet of wheels 10 each rotationally mounted relative to the vessel 8. In addition, a hitch arrangement 12 extends from the front of the vessel 8 so that the tractor can be hitched to the buggy 4. The grain buggy 4 also includes a distribution auger 14 extending along an upper portion of the vessel 8. In use, the distribution auger 14 rotates so that heaped grain piled too high is distributed within the vessel 8. The distribution auger 14 has two blades of opposite pitch.

Figure 3A:
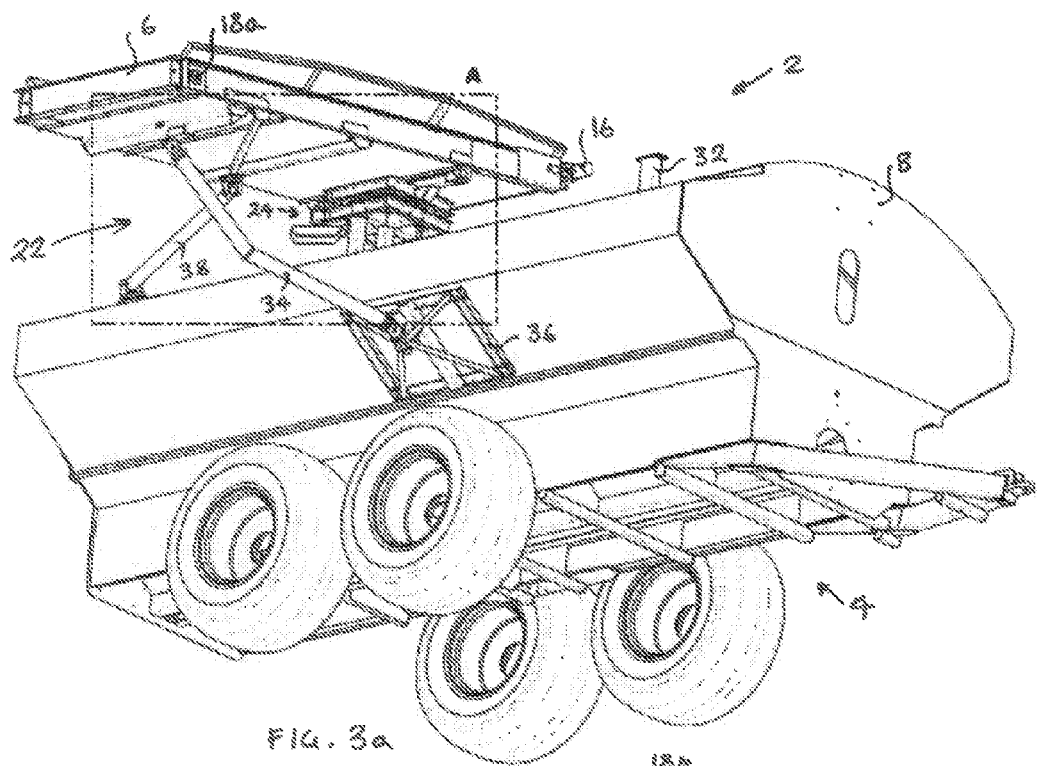
FIG. 3a is a lower perspective view of the grain buggy of FIG. 1 with the conveyor in the grain loading configuration.
Figure 3B:
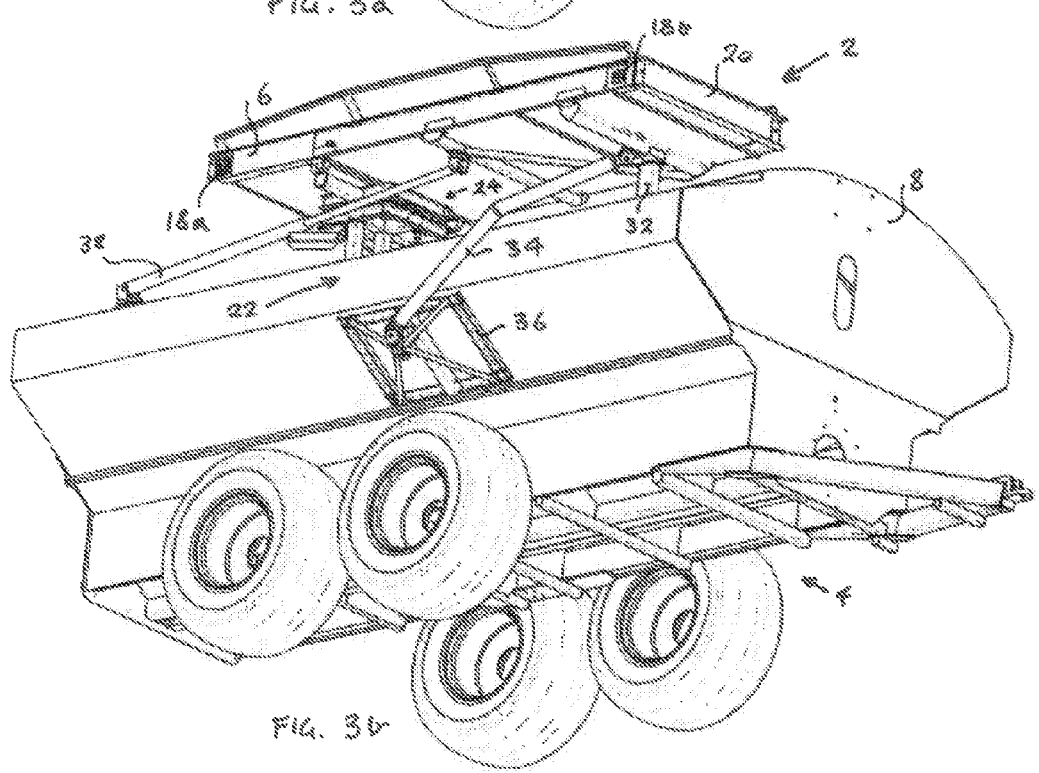
FIG. 3b is a lower perspective view of the grain buggy of FIG. 1 with the conveyor in the retracted configuration.

Turning to FIG. 3, the grain buggy assembly 2 includes a hydraulic arrangement 16 having a hydraulic pump, and a hydraulic motor coupled to the hydraulic pump so as to drive the conveyor 6. The hydraulic arrangement 16 also has another hydraulic motor coupled to the pump for driving the distribution auger 14. The conveyor 6 is a belt conveyor including a pair of rollers 18a, 18b about which an endless belt 20 extends. The conveyor 6 is pivotally mounted to the grain buggy 4. Elaborating further, the grain buggy assembly 2 further includes a moving arrangement 22 for pivoting the conveyor 6 from the grain loading configuration (FIG. 3a) to the retracted configuration (FIG. 3b), and visa versa.

Figure 4:
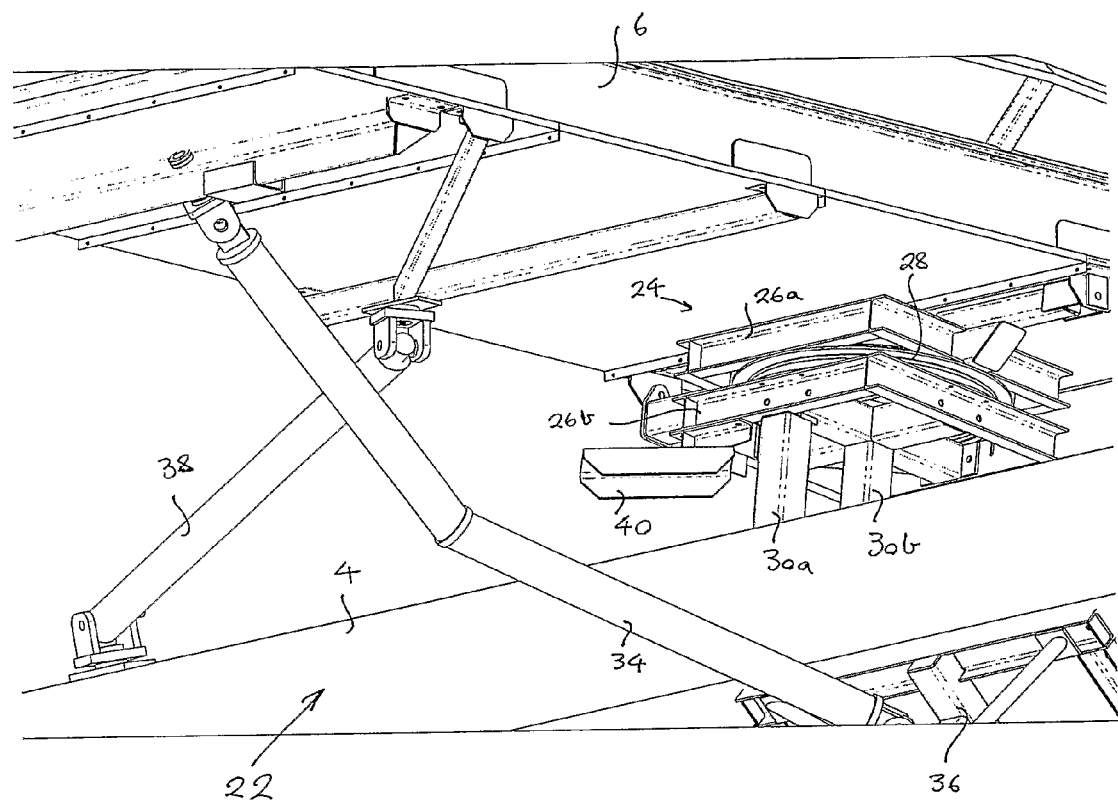
FIG. 4 is a blown up view of window A in FIG. 3 showing a moving arrangement for pivoting the conveyor from the grain loading configuration to the retracted configuration, and visa versa.

Turning to FIG. 4, the moving arrangement 22 includes a conveyor support 24 for extending upwardly from the grain buggy 4 and for fastening to an unloading end of the conveyor 6. The conveyor support 24 includes a pair of panels 26a, 26b between which a rotational slew ring 28 is provided so that the panels 26a, 26b can pivot relate to each other. The conveyor support 24 further includes a pair of uprights 30a, 30b terminated by the bottom panel 26b. The top panel 26a is fixedly fastened to the underside of the conveyor 6.

Returning to FIG. 3b, the grain buggy assembly 2 further includes another conveyor support 32 extending upwardly from the grain buggy 4 and for supporting a loading end of the conveyor 6 in the retracted configuration. The moving arrangement 22 further includes a stabilising arm 34 extending between a loading end of the conveyor 6 and the grain buggy 4. Furthermore, the moving arrangement 22 includes a stabilising arm support 36 for fastening to an outside wall of the grain buggy 4 to support the stabilising arm 34.

The moving arrangement 22 also includes a telescopic ram 38 extending between the conveyor 6 and the grain buggy 2. A conveyor end of the ram 38 is connected to the conveyor 6 between the stabilising arm 34 and the conveyor support 24. The moving arrangement 22 includes the hydraulic arrangement 16, in turn, including a hydraulic motor coupled to the pump for extending the hydraulic ram 38 to move the conveyor 6 from the grain loading configuration to the retracted configuration. In the event of a hydraulic motor or pump breakdown, the conveyor 6 can be manually moved between the retracted and grain loading configurations, and visa versa. In addition, the moving arrangement 22 includes an actuator (not shown) for actuating the hydraulic motor. As can best be seen in FIG. 4, the grain buggy assembly 2 also includes a ram support 40 extending from the conveyor support 24 to support the midpoint of the extended ram 38.

A method for loading the grain buggy 4 using the conveyor 6 is briefly described.

Initially, the tractor can tow the grain buggy 4 adjacent the combine whilst the buggy 4 remains in previously formed combine tracks. The conveyor 6 is in the grain loading configuration and can receive grain from the combine auger. In turn, the conveyor 6 conveys the grain to the buggy 4 where it forms a pile. The distribution auger 14 rotates so that heaped grain piled too high is distributed within the storage vessel 8 of the buggy 4.

Once the buggy 4 is filled with grain, the actuator is actuated to extend the ram 38 and pivot the conveyor 6 from the grain loading configuration to the retracted configuration. The buggy 4 can then be taken to a truck for unloading.

Once unloaded, the buggy 4 can return to the combine. In turn the actuator can be actuated to retract the ram 38 and pivot the conveyor 6 from the retracted configuration to the grain loading configuration for receiving grain once more.

A person skilled in the art will appreciate that many embodiments and variations can be made without departing from the ambit of the present invention.

In one embodiment, a conveyor assembly may be provided for retrofitting to a grain buggy 2. The conveyor assembly would include the conveyor 6 and the moving arrangement 22. In yet another embodiment, the moving arrangement 22 would be provided in kit form.

In one embodiment, the conveyor belt 20 is of comparable width to the length of the grain storage vessel 8 to minimise reliance on the distribution auger 14 to distribute the stored grain. In yet another embodiment, the conveyor 6 can be mounted on a carriage which, in turn, can be moved to and fro along the storage vessel 8 to evenly distribute grain in the vessel 8.

In the preferred embodiment described, the moving arrangement 22 enabled pivoting of the conveyor 6 relative to the buggy 4. In an alternative embodiment, the moving arrangement can instead include a chassis mounted to the buggy 4, and a carriage movably mounted to the chassis and carrying the conveyor. In this manner, the carriage can be extended relative to the chassis to move the conveyor 6 from a retracted configuration in which the conveyor is retracted relative to the buggy 2 to a grain loading configuration in which the conveyor 6 extends from the buggy 4 to receive grain for conveyance to the buggy 4.

In the preferred embodiment, the grain buggy 4 was adapted to be towed by a tractor. In another embodiment, the grain buggy 4 may be motorised and in the form of a truck.

In the preferred embodiment, the hydraulic arrangement 16 included a hydraulic pump coupled to three hydraulic motors for driving the conveyor 6, distribution auger 14 and hydraulic ram 38. In an alternative embodiment, the hydraulic arrangement may be replaced by an electrical arrangement driving three respective electric motors, in turn, driving the conveyor 6, distribution auger 14 and ram 38.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The claims defining the invention are as follows:

1. An agricultural grain buggy assembly for operation adjacent a separate combine spaced from the grain buggy, the combine having an auger to move grain, the buggy including:
    agricultural grain storage vessel as part of the buggy;
    a conveyor carried by the buggy having a loading end, and having a movable belt positioned and arranged so that at least a portion thereof is located vertically over the storage vessel and arranged to move in a direction to receive grain from the combine auger and convey the received grain by movement of the belt to the storage vessel, the conveyor being movably mounted to the buggy so that the conveyor can be moved from a retracted configuration in which the conveyor is retracted relative to the buggy to a grain loading configuration in which the conveyor can extend from the buggy to receive the grain from the combine auger onto its loading end; and
    a moving arrangement for moving the conveyor from the retracted configuration to the grain loading configuration and vice versa, comprising conveyer supports fastened to the conveyor, one conveyor support comprising first and second elongate arms pivotally connected to each other, the outer end of the first arm pivotally connected to the loading end of the conveyor, the outer end of the second arm pivotally located on the exterior of the storage vessel, another conveyor support comprising a telescopic ram pivotally connected to the conveyor and pivotally located on and extending upwardly from the exterior of the storage vessel, and a conveyor support for extending upwardly from the grain buggy for fastening to the conveyor and which includes a pair of panels having confronting flat parallel surfaces between which a rotational slew ring bearing is provided so that the panels can rotate with respect to each other.

2. A grain buggy as claimed in claim 1 wherein, in the retracted configuration, the conveyor is aligned along the grain buggy and, in the loading configuration, the conveyor extends transverse and at a right angle to the buggy.

3. A grain buggy as claimed in claim 1, wherein the grain buggy includes a distribution auger horizontally extending lengthwise along an upper portion of the storage vessel for distributing heaped grain within the vessel.

4. A grain buggy as claimed in claim 3, further including a hitch arrangement extending from the storage vessel and for hitching the buggy to a vehicle.

\* \* \* \* \*